(No Model.)
J. O. PATRIDGE.
HAND ROCK DRILL.
No. 380,051. Patented Mar. 27, 1888.
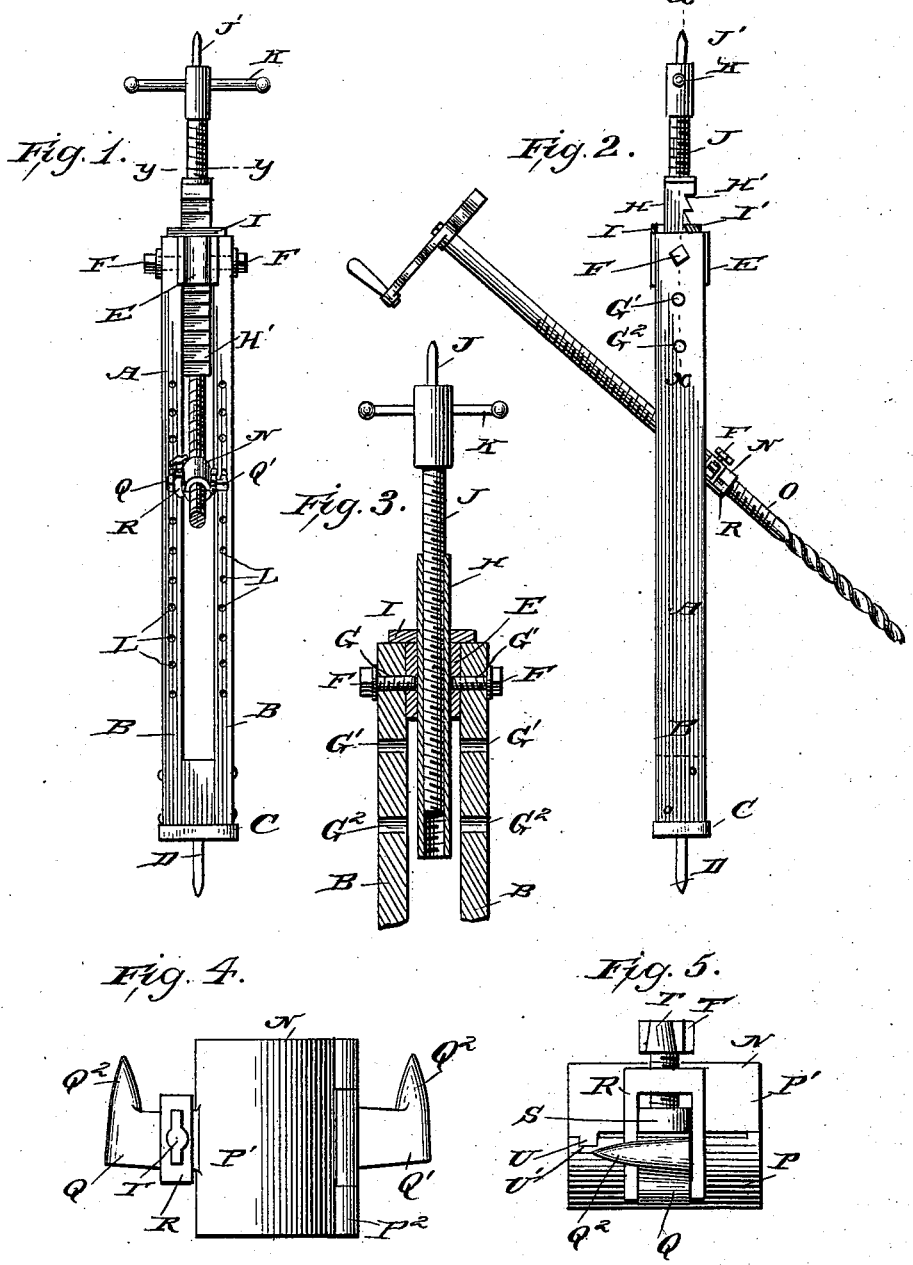
WITNESSES:
N. R. Davis
C. Sedgwick
INVENTOR:
J. O. Patridge
BY Munn & Co
ATTORNEYS.

UNITED STATES PATENT OFFICE.

JAMES O. PATRIDGE, OF WELLSTON, OHIO.

HAND ROCK-DRILL.

SPECIFICATION forming part of Letters Patent No. 380,051, dated March 27, 1888.

Application filed November 10, 1887. Serial No. 254,747. (No model.)

*To all whom it may concern:*

Be it known that I, JAMES O. PATRIDGE, of Wellston, in the county of Jackson and State of Ohio, have invented a new and Improved Hand-Drill, of which the following is a full, clear, and exact description.

The object of my invention is to provide a new and improved hand-drill for miners' use, which permits a quick and sure adjustment of the drilling-tool and the drilling-post.

The invention consists of a nut of peculiar construction and held adjustably on the drilling-post, which is provided on top with an adjustable point.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is an end elevation of my improvement. Fig. 2 is a side elevation of the same, parts being in section. Fig. 3 is an enlarged sectional elevation of part of my improvement on the line $x\ x$ of Fig. 2. Fig. 4 is an enlarged plan view of the nut. Fig. 5 is a side elevation of the same, and Fig. 6 is an enlarged sectional plan view of my improvement on the line $y\ y$ of Fig. 1.

My improved hand-drill is provided with a post, A, consisting of two uprights, B B, held a suitable distance apart and connected with each other at the bottom by a cross-piece, C, having a downwardly-extending point, D. The upper ends of the uprights B B are connected with each other by a cross-piece, E, held in place by bolts F, passing through apertures G or G' or $G^2$ in the uprights B B, and also passing into apertures formed in said cross-piece E. The apertures G, G', and $G^2$ are located one above the other, so as to permit a vertical adjustment of the cross-piece E on the uprights B B by means of said bolts F.

In the cross-piece E is formed a square aperture, into which fits a bar, H, provided on one edge with teeth H', adapted to be engaged by one inner edge, I', of a supporting-plate, I, held loosely on top of said cross-piece E. The bar H is hollow and internally threaded to receive and hold a screw-rod, J, provided on its upper end with a point, J', and also provided with handles K for conveniently turning said screw-rod J in the threaded bar H.

The two uprights B B are provided at their front edges with apertures L, in which is held the vertically-adjustable nut N, into which screws the threaded shank of the drilling-tool O, of any approved construction. The nut N consists of the two parts P and P', hinged together at $P^2$, so that one part, P', can be thrown open for the admission of the drilling-tool O. On the lower part, P, are formed sidewise-extending lugs Q and Q', each provided with an inward-pointed projection, $Q^2$, fitting into the respective apertures L in the uprights B B. On the lug Q are pivoted the ends of a U-shaped bail, R, extending upward and fitting over a lug, S, formed on the upper part, P', of the nut N. A screw, T, screws into the upper part of the bail R and on the top of the lug S.

The operation is as follows: In order to adjust the post A to any height or width of mine, the operator first sets the uprights B B in the desired position with the point D resting in the bottom or on one side of the mine. The operator then raises the bar H so that the point J presses against the ceiling or the other side of the mine, and then places the plate I in such a position that its inner edge, I', engages the first tooth projecting above the cross-piece E. The operator then turns the handle K, so that the screw-rod J screws outward, whereby the points D and J' are firmly sunken into the bottom and ceiling or sides of the mine, and thus the post A is held securely in position.

The cross-piece E is made adjustable on the uprights B B, so as to enable the operator to set the drilling-post A in mines of very low or narrow dimensions, and in this case the operator screws the bolts F into the respective apertures G' or $G^2$, and then saws off the remaining part of the posts B B, which extend above the upper edge of the cross-piece E. The operator then takes the open nut N and places the points $Q^2$ in apertures L, located at the desired height at which the drilling-tool O should operate. The apertures L are rather close together, so as to permit of a very accurate adjustment of said nut N on the uprights B B. The threaded part of the drill-tool O is then placed in the lower part, P, of the nut N, and the upper hinged part, P', is closed on said lower part, P, after which the operator throws the bail R upward over the lug S and then screws the screw T down on said lug S, whereby the hinged parts P and P' of the nut N are held in a locked position. I prevent the parts P and P' of the nut N from shifting laterally by a projection, U, formed on the part P' and engaging a corresponding aperture, U', on the lower part, P. The operator then turns the handle of the drilling-tool O in the usual manner in order to bore a hole in the vein of the mine.

It will be seen that I am thus enabled to adjust the drilling-post to the varying height of the mine rapidly and accurately, and at the same time I can place the drilling-tool O in any desired position according to the location of the vein in the mine.

Having thus fully described my invention, I claim as new and desire to secure by Letters Patent—

1. In a hand-drill, the combination, with a post provided with two uprights having a series of apertures in their front edges, of a nut made in two parts hinged together and formed with integral right-angled projections and fitting into said apertures in the uprights, substantially as shown and described.

2. In a hand-drill, the combination, with a post provided with two uprights having a series of apertures in their front edges, of a nut made in two parts hinged together, right-angled projections formed on one of the hinged parts and fitting into said apertures in the uprights, a bail pivoted to one of said hinged parts and provided with a thumb-screw, and a lug, S, formed on the other hinged part, whereby the said hinged parts may be securely locked together, substantially as shown and described.

3. The nut N, formed of two hinged parts, one of said hinged parts having sidewise-extending lugs Q and Q', each provided with a pointed projection, $Q^2$, extending in the direction of the axis of the nut, and means, substantially as described, for locking said hinged parts.

4. The nut N, formed of two hinged parts, P and P', the part P being provided with the sidewise-extending lugs Q and Q', each provided with a pointed projection, $Q^2$, extending in the direction of the axis of the nut, and the bail R, having the thumb-screw T, pivoted to the lug Q, and the part P' being provided with a lug, S, against which the thumb-screw T bears, whereby the said hinged parts may be securely locked, substantially as shown and described.

5. In a hand-drill, a post provided with two uprights and cross-piece held on the top of said uprights, in combination with an internally-threaded toothed bar adapted to slide on said cross-piece, a screw-rod pointed at its upper end and screwing in the said bar, and a sliding supporting-plate engaging the teeth of said bar and held on top of said cross-piece, substantially as shown and described.

6. In a hand-drill, the combination, with a post provided with two uprights having apertures near their upper ends, a cross-piece held between the uprights near their upper ends, and bolts passing through said apertures in the uprights and into apertures formed in said cross-piece, of an internally-threaded toothed bar held to slide in said cross-piece, a screw-rod pointed at its upper end and screwing in said toothed bar, and a sliding supporting-plate engaging the teeth of said bar and held on top of said cross-piece, substantially as shown and described.

JAMES O. PATRIDGE.

Witnesses:
H. S. RUPP,
J. M. PATRIDGE.